Figure 1:
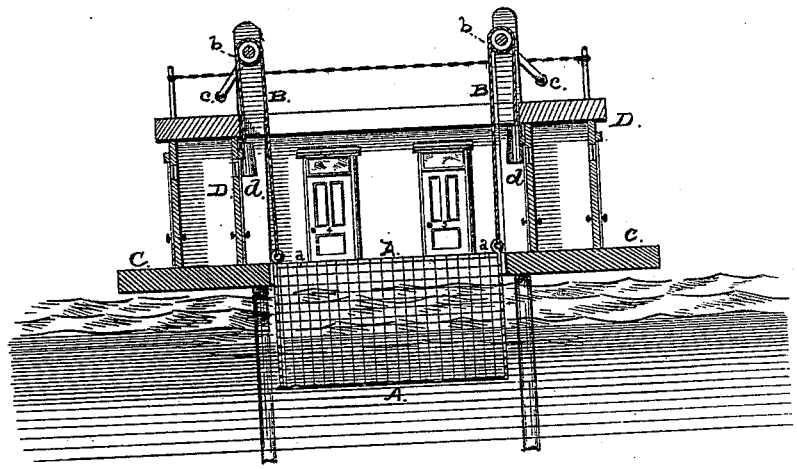

J. J. BAMBER.
Deep Water Safety-Bath.

No. 208,360.  Patented Sept. 24, 1878.

Witnesses:
Will and W. Osborn
Edward C. Osborn

Inventor:
Joseph J. Bamber
By C. W. M. Smith
his Atty.

UNITED STATES PATENT OFFICE.

JOSEPH J. BAMBER, OF SAN FRANCISCO, CALIFORNIA.

IMPROVEMENT IN DEEP-WATER SAFETY-BATHS.

Specification forming part of Letters Patent No. 208,360, dated September 24, 1878; application filed April 12, 1878.

*To all whom it may concern:*

Be it known that I, JOSEPH J. BAMBER, of the city and county of San Francisco, State of California, have invented a new and useful Improved Deep-Water Safety Bath-House, which invention is fully set forth in the following specification, and in the drawing herein referred to.

My invention has for its object to provide a bath for deep-water swimming and bathing, by which timid persons and poor swimmers can have the advantage and benefit of deep-water bathing with safety from sharks, &c.

To this end I employ a cage or guard of wire netting or cloth, having a bottom and sides, but an open top, which cage I submerge or suspend at proper depth below the surface from a suitable frame or from floats, in such a manner that it is held with its bottom at the required depth in the water, and thus provides a suitable inclosure and a support or floor to the person bathing within it, whereby sharks, sea-weed, and floating impurities are kept out of the bath, and a greater confidence is given to the bather in having a bottom to stand or rest upon.

Figure 2:
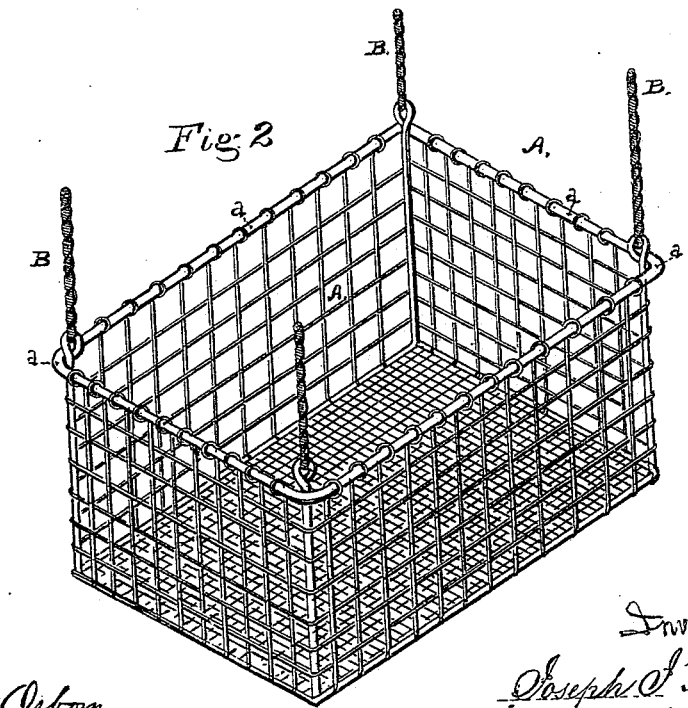

In the accompanying drawing, Figure 1 is a vertical sectional view of my invention, arranged with a suitable frame or house. Fig. 2 is a detail view of the wire guard or cage.

The guard or cage A is formed of the required size and depth from wire-netting or heavy wire-cloth, with coarse meshes and with a strengthening-frame, *a*, either of wood or metal, around the edges, to which ropes or chains B can be attached for raising it out of the water, and for holding it therein at the required depth. The interstices between the wires can be large enough to allow a free passage of water through them, and yet small enough to keep out any substances or animals, and the floor of the cage can be formed of finer meshes, if desired, to afford a better or smoother foot-hold to the bather; or the sides and bottom can be formed of the same-sized netting, whose openings are small enough to prevent the feet of the bather from passing through them. This cage or guard A is held in position within a platform, C, that is either anchored in position to floats or fastened permanently in place by means of piles; and a means for lifting the cage out of the water for cleaning, or at the close of the season, is provided, as shown in the drawing, Fig. 1, consisting of the ropes or chains B B, the shafts and pulleys *b b*, and cranks *c c*, the weight of the cage being counterpoised by the use of weights *d d*. This cage can be combined or arranged with a suitable bath-house, D D, upon the platform C, surrounding the cage, with rooms or compartments opening into the inner space, and also to the outside of the house, to accommodate bathers desiring to use the outside water for diving and swimming.

As thus constructed, my invention enables timid persons and ladies to obtain the advantages of deep-water bathing, and it affords a safe and clean bathing-house or space, in which persons can the more quickly acquire the art of swimming and floating by reason of the confidence given to them and the greater buoyancy incident to deep water.

The advantages and superiority of my invention over the wooden flooring or bottom sometimes used will be apparent to any one, because of the cleanliness and lightness and better circulation of the water through the bath.

Having thus fully described my invention, what I claim as new therein, and desire to secure by Letters Patent, is—

1. A safety cage or guard for deep-water bathing, composed of wire-netting A on the bottom and sides, and with a frame or rim, *a*, around the top, combined with a suitable supporting-platform for holding it in the water, with its bottom at any required depth below the surface, substantially as described and shown.

2. A bathing apparatus consisting of the cage A, platform C, and means for adjusting the position of such cage in the water, substantially as described and shown.

In testimony that I claim the foregoing I have hereunto set my hand and seal this 1st day of April, 1878.

JOSEPH J. BAMBER. [L. S.]

Witnesses:
C. W. M. SMITH,
CHAS. E. KELLY.